United States Patent
Nelson et al.

(10) Patent No.: US 10,901,726 B2
(45) Date of Patent: Jan. 26, 2021

(54) INTELLIGENT VISUAL REGRESSION SYSTEM

(71) Applicant: International Business Machines Corporation, Armonk, NY (US)

(72) Inventors: John C. Nelson, Newtown, CT (US); Tamer E. Abuelsaad, Armonk, NY (US); David Nixon, Sandy Springs, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/158,870

(22) Filed: Oct. 12, 2018

(65) Prior Publication Data

US 2020/0117444 A1    Apr. 16, 2020

(51) Int. Cl.
| | |
|---|---|
| *G06F 9/44* | (2018.01) |
| *G06F 8/71* | (2018.01) |
| *G06N 3/02* | (2006.01) |
| *G06F 11/34* | (2006.01) |
| *G06F 8/38* | (2018.01) |

(52) U.S. Cl.
CPC ............. *G06F 8/71* (2013.01); *G06F 8/38* (2013.01); *G06F 11/3438* (2013.01); *G06N 3/02* (2013.01)

(58) Field of Classification Search
CPC ...................................................... G06F 9/445
See application file for complete search history.

(56) References Cited

U.S. PATENT DOCUMENTS

| | | |
|---|---|---|
| 6,046,740 A | 4/2000 | Laroche et al. |
| 6,934,415 B2 | 8/2005 | Stentiford |
| 8,433,142 B2 | 4/2013 | Deng |
| 9,348,727 B1 | 5/2016 | Cai et al. |
| 9,600,519 B2 | 3/2017 | Schöning et al. |
| 2006/0188147 A1* | 8/2006 | Rai .................. H04N 9/045 382/162 |

(Continued)

OTHER PUBLICATIONS

Benaka, M. "Our latest improvement to QA: Screenshot Testing—Analytics Platform—Piwik"; Feb. 18, 2015; https://piwik.org/blog/2013/10/our-latest-improvement-to-qa-screenshot-testing/; Downloaded Nov. 9, 2017. 12 pages.

(Continued)

*Primary Examiner* — Jae U Jeon
(74) *Attorney, Agent, or Firm* — Richard A. Wilhelm

(57) ABSTRACT

Methods and apparatus, including computer program products, implementing and using techniques for identifying program code changes causing a changed visual appearance of a graphical user interface of a computer application. A code change is received for the computer application in a build system. The code change results in a changed computer application. The changed computer application is run and screenshots of the visual appearance of the graphical user interface are captured and saved during the run. Differences between the saved screenshots are detected to identify changes in the visual appearance of the graphical user interface. The identified changes in the visual appearance are correlated with a particular section of program code causing the changes in the visual appearance.

11 Claims, 2 Drawing Sheets

(56) References Cited

U.S. PATENT DOCUMENTS

| | | | |
|---|---|---|---|
| 2007/0236595 A1* | 10/2007 | Pan | G06T 3/0018 |
| | | | 348/335 |
| 2009/0034803 A1* | 2/2009 | Matos | G06K 9/00 |
| | | | 382/116 |
| 2011/0243459 A1 | 10/2011 | Deng | |
| 2012/0084684 A1* | 4/2012 | Kota | G06F 11/3672 |
| | | | 715/762 |
| 2012/0133671 A1* | 5/2012 | Setou | G06T 7/0012 |
| | | | 345/593 |
| 2012/0159434 A1 | 6/2012 | Dang et al. | |
| 2012/0284693 A1* | 11/2012 | Tannous | G06F 8/71 |
| | | | 717/121 |
| 2014/0075371 A1* | 3/2014 | Carmi | G06F 9/451 |
| | | | 715/781 |
| 2015/0149493 A1 | 5/2015 | Schöning et al. | |
| 2017/0004123 A1 | 1/2017 | Bell et al. | |
| 2017/0131867 A1 | 5/2017 | Parthipan et al. | |

OTHER PUBLICATIONS

"Applitools: Features: Discover the features that set Applitools apart"; https://applitools.com/features: Downloaded Oct. 12, 2018. Applitools. 2018. pp. 1-6.

Shore, James; "Quixote—CSS Unit and Integration Testing"; GitHub today ; https://github.com/jamesshore/quixote; Downloaded Oct. 12, 2018. GitHub, Inc. 2018. pp. 1-11.

* cited by examiner

INTELLIGENT VISUAL REGRESSION SYSTEM

BACKGROUND

The present invention relates to graphical user interfaces (GUIs) for computing devices, and more specifically, to testing of GUIs during the development stage.

Existing test suites for software applications are fairly common and are primarily focused on testing a specific functionality such as a math library computation or the allocation and deallocation of memory in a given stack. These test suites however typically do not test the final rendered appearance of an application and are typically limited to evaluating the scripting code, such as Cascading Style Sheet (CSS) in web browsers, to gauge the overall appearance rather than the actual rendered product.

With recent pushes to more agile development landscapes, and with code changes occurring more rapidly, it is becoming imperative to know exactly what impact code changes may have on a visually rendered product. Thus, there is a need for improved techniques for testing GUIs during the development of software products.

SUMMARY

According to one embodiment of the present invention, methods, systems and computer program products are provided for identifying program code changes causing a changed visual appearance of a graphical user interface of a computer application. A code change is received for the computer application in a build system. The code change results in a changed computer application. The changed computer application is run and screenshots of the visual appearance of the graphical user interface are captured and saved during the run. Differences between the saved screenshots are detected to identify changes in the visual appearance of the graphical user interface. The identified changes in the visual appearance are correlated with a particular section of program code causing the changes in the visual appearance The details of one or more embodiments of the invention are set forth in the accompanying drawings and the description below. Other features and advantages of the invention will be apparent from the description and drawings, and from the claims.

DETAILED DESCRIPTION

Figure 1:
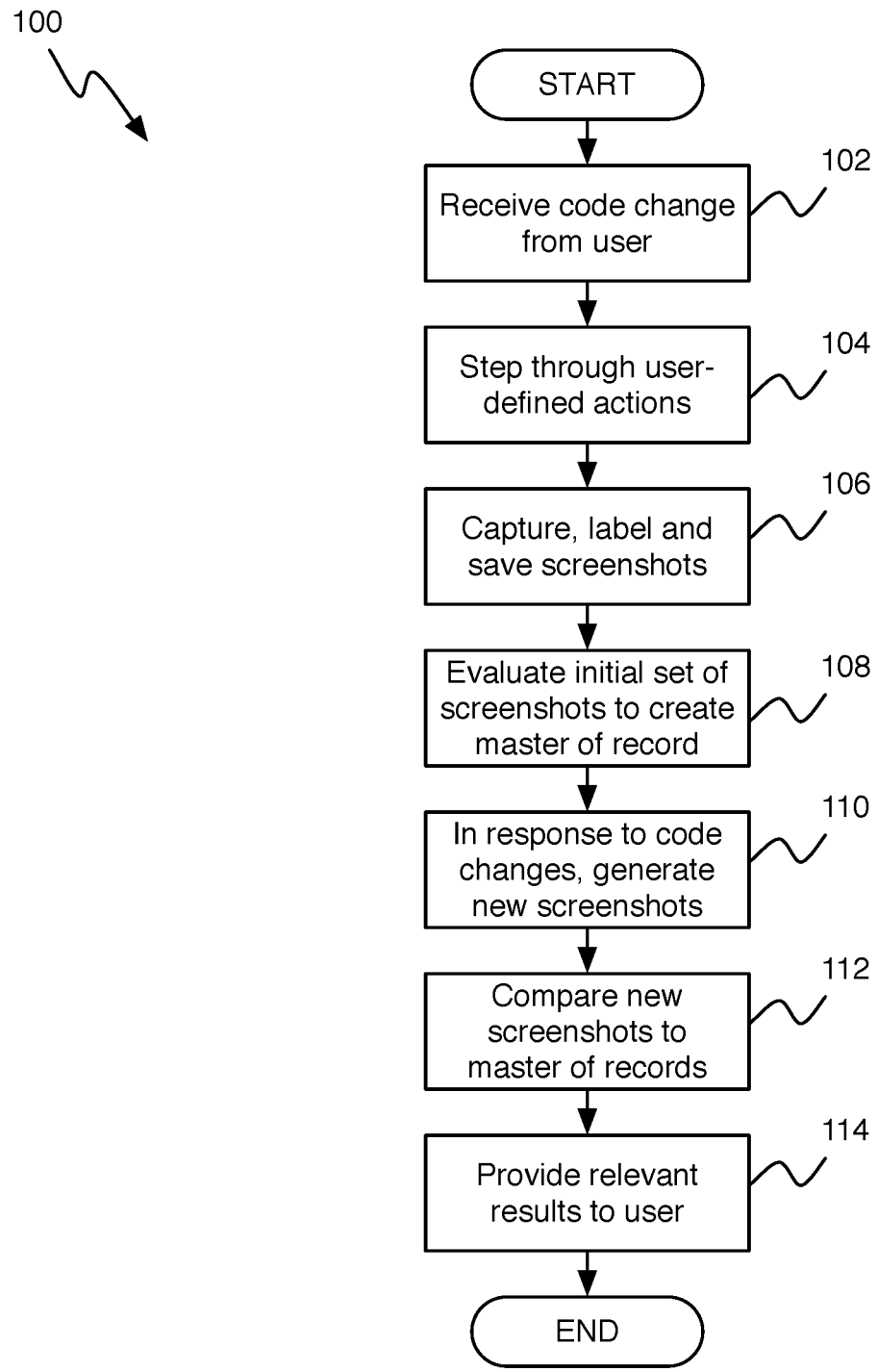
FIG. 1 shows a process for testing the effects that programming code changes have on the rendering of a graphical user interface, in accordance with one embodiment.

The various embodiments of the invention pertain to techniques for identifying code changes that produce a bug in a GUI of an application, flag these identified code changes to a developer/tester, and to automatically learn over time which code changes are worth flagging and which code changes can be ignored.

As will be described in further detail below, certain embodiments of the invention are focused on the rendered portion of the application, and other embodiments may also encompass the entire project code and integration. Using computer vision processing techniques, the rendered output of the application (equivalent of a "screen shot" or a "scene") can be captured and regressions in visual appearances and any/overall changes, even in dynamic scenes, can be evaluated. In conventional testing environments, this is an especially challenging problem to solve, due to synchronization issues. For example, unless there is a mechanism inside of an application to set the exact time at which to take a screen shot (which includes setting every single time in the application to the same value), there will inevitably be variance between images taken in successive runs. For example, if an application is told: "Do this one event, wait 1.00 seconds, then take a screen shot," the screen shot may be taken after 1.08 seconds in one test run of the application, and after 1.20 seconds in another test run. Thus, aligning the two images and/or objects in the images becomes especially paramount.

Since certain movement will be allowed in between successive snapshots and as changes are made over time to the application, it is very difficult to know, for example, that "in section A of the application, things may change colors, but they should not move" and, conversely, that "in section B, things may move, but they may not change colors." Predefining such rules in conventional systems is especially cumbersome and therefore, a cognitive component as used in the various embodiments described herein can more efficiently address such issues.

Various embodiments of the invention can be integrated into a build system, in which a code change can be submitted and an application will be built, which includes the new code change. Many code testing platforms of this type are known to persons having ordinary skill in the art. Some examples of code testing platforms include Github and Travis CI, respectively, but it should be clear that the various embodiments of the invention can be implemented in any code management and/or integration testing platform.

In accordance with some embodiments, a user first submits a code change to a code repository, which initiates the build process. During the build process, the application is run and stepped through using a series of user defined steps that interact with the application interface (e.g., moving the interaction device, typing in keys, etc.). After completing each of these steps, or at any timed moment, a screenshot is taken, which is associated with a unique capture label, and then saved for future use.

These screenshots between successive code pull requests can then be compared or evaluated to determine any visual changes that are made on the GUI as a result of a piece of code that has changed. Over time, and based on which visual changes are ignored (merged) and which visual changes cause further code updates (updated pull request) by an application developer, the system can learn and weigh what changes are more important to highlight and use this information to filter out the least significant changes in order to prevent information overload for the application developer. This is especially critical in large systems where there may be thousands of tested scenes or screenshots, but only some changes are important enough to be addressed by a user.

The various embodiments that are described herein can include one or more of the following advantages:

Maintainability/Updating the testing: When a piece of code is checked into a build system, the build system will run through the application and generate images based on the piece of code, and subsequently highlight them to a user. If the user "accepts" this commit, then the images that were just captured become a "ground truth" (as will be further explained below), and any further commits are compared to that set of "ground truth" images. Current solutions do not combine the feedback given by a by accepting the changes and updating its "internal model" of what ground truth is. In contrast, they require a user to manually go in, retake images, update test configurations, etc. Thus, the various embodiments of the invention allow any work added by a user to be minimized as much as possible.

Significant reduction in overwhelming the user: Some existing systems compare pixels directly. The problem is, however, that such systems are inherently sensitive, whereas the various embodiments described herein can either be set to detect noticeable differences, or even learn over time what "differences" are significant enough to be reported to a user, as will be explained in further detail below.

Learning over time what differences matter: By adding in a feedback loop, a system in which the various embodiments can be implemented is able learn what is considered to be a significant difference, based on a user "accepting" or "rejecting" a code commit request. In some embodiments, this can be further expanded to using neural networks to aid with determining what changes are or are not important to a user.

Tell what/how things have changed: For example, assume a cube is displayed on a screen in a "previous image". Next, a "current image" is taken for the new code commit, in which the same cube is slightly rotated. The system is then capable of informing the user that there was a rotation of 10 degrees around the Y axis. In contrast, existing solutions would merely inform the user that something is different because pixels do not match but, would not be able to specify what is actually different in the current image and would have to rely on a human user to make that determination.

These and other further advantages will be addressed in further detail below.

Various embodiments of the invention will now be explained by way of example and with reference to the drawings. However, it should be realized that these are merely exemplary embodiments, and that many variations that fall within the scope of the appended claims can be made by those having ordinary skill in the art. With reference to FIG. 1, a process 100 for testing the effects that programming code changes have on the rendering of a graphical user interface will now be described.

As can be seen in FIG. 1, a code change to a code repository is received, which kicks off the build process, step 102. During the build process, the application is run and stepped through, using a series of user defined actions which interact with the application interface, step 104. Such actions can include, for example, moving the interaction device, typing in keys, etc.

After completing each of these actions or at any timed moment as previously specified by a user (e.g., "go to this place and wait 5 seconds then take a snapshot"), a screenshot is taken and uniquely named using a capture label, and saved for future use, step 106.

The initial set of screenshots is manually validated by users (e.g., developers, testers, etc.), who are able to see full-size screen captures, step 108. This is done to guarantee a known or correct initial state. Once these images are verified and this code change is merged, the new 'master of record' screenshots is tagged with a Commit ID. As is well known to those having ordinary skill in the art, a Commit ID is a "hash" computed to uniquely identify a point-in-time at which code is being developed. For example: Say a user wrote one paragraph in this document and were to generate a "hash" for that paragraph, which produced "AB7CEHD", i.e., the "Commit ID". A week later, the user adds in another paragraph and checks it in. Now your previous paragraph and the new paragraph produces a new "hash" or Commit ID: "8aSJD12". If a single character is changed in any of the paragraphs, the Commit ID or "hash" will change. That way, it is always possible to refer back to a "specific point in time" for the state of a document or for the state of a section of code. Furthermore, a human validation can also indicate parts of a screen that are valid and parts that are not, rather than an "all-or-nothing" approach.

For every future code submission change, screenshots are generated at certain key points when stepping through the build application, step 110. These screenshots are then compared to the 'master of record' set of screenshots, step 112. There are multiple, user-configurable, methods in which the comparison can be made, in accordance with various embodiments. Some of these methods include:

1. Doing a direct pixel-by-pixel comparison of a scene. If there are any pixels that differ, generating a 'Difference Map' of the detected changes. This method is advantageously used in static applications/scenes and is best suited to detect color changes in particular. In a similar embodiment, instead of doing a pixel-by-pixel comparison, a localized "entropy" or "disorder" can be computed in various segments of an image. Then, when two localized entropies are compared, and there is a difference between them that exceeds a specified threshold value, it is considered to be a relevant finding. This approach allows less 'granular' comparison of larger segments, rather than individual pixels.

2. Doing a direct pixel-by-pixel comparison of "before" and "after" screenshots of a dynamic scene. In some embodiments, a convolution filter can optionally be applied before comparing the data in order to "smooth out" the respective screenshots. If the comparison reveals that the "before" and "after" screenshots are different, then the method examines and describe how those pixels/objects in the scene have moved. Various techniques can be used to determine such movement of pixels/objects.

(a) In one embodiment, a Localized Optical Flow method (such as a Lucas-Kanade method, as is well-known to those having ordinary skill in the art) is applied on a sub-image area. This method makes it possible to capture how an object has moved in the event that snapshots are not taken at exactly the same time (1.05 seconds vs 1.07 seconds, for example), filter out any "false positives" in more active scenes, and then return a result to the user, such as "This element was shifted (X,Y) pixels."

(b) In another embodiment, more robust feature detection methods, such as SURF (Speeded Up Robust Features) or any other feature detector, are used to determine feature points (between local clusters of different pixels) in the "before" and "after" screenshots. Then, algorithms such as RANSAC (Random Sample Consensus) are used to determine which feature points match in the "before" and after "photos."

Finally, a transformation matrix is derived between matching sets of feature points, which transformation matrix describes how the objects in the scene were rotated and translated.

3. In the event that a scene depicts static objects but the camera position is rotated about the scene, the "before" and "after" photos can be aligned by:
  (a) Extracting features, using SURF or some other algorithm, from the before and after photos;
  (b) Aligning the features, using, for example, RANSAC.
  (c) Computing a transformation matrix between the aligned before and after features, which describes how the entire scene is rotated.

These are merely a few examples of possible comparison methods, and many other variations of comparing screenshots can be envisioned by those having ordinary skill in the art.

Finally, the relevant results of the comparisons are provided to the user, step 114, which ends the process. What is considered to be "relevant results" can be refined over time by using a feedback loop that allows the system to learn what to present to the user and thereby avoid "information overload" to the user.

For example, at first, the system may start out very sensitive and determine all color/location/rotation/etc. discrepancies between a "before" image and an "after" image of a dynamic scene. Since many things may change at once, it is beneficial to have a cognitive component that is able to understand what visual changes are important. Such a cognitive component can be implemented, for example, as a neural network and make use of the above-mentioned descriptors that describe not only what things are changing between the "before" and "after" images, but also how the things are changing.

The system tracks what changes are merged and not merged, respectively, by the human code reviewer. If the system identifies a visual difference, but the code reviewer did not seem to care about the that difference, the system learns that such a change is less important or insignificant, and can be weighed lower compared to other changes (e.g., ones that resulted in the code reviewer taking some kind of action). Again, neural network models may be suitable for use in these contexts. Through continued use of such a feedback loop, the system will eventually filter out and avoid reporting "insignificant" changes to the code reviewer, thereby lessening the review burden for the code reviewer. Conversely, if a code commit were updated after the system detects a change, then such a change could be given a higher weighting.

Furthermore, from this feedback loop, the system can also understand what scenes have more 'noise' (e.g., very dynamic scenes), and can selectively change the sensitivity for such scenes, based on measuring the distribution of changes between successive builds. Again, over time, the system will aim to return only relevant results to the user, as described above.

Further, in one embodiment, objects or items in one scene or screenshot can be segmented, and then subsequently identified when they reappear in a different scene or screenshot. For example, assume that an individual's face appeared in scene 1, and was segmented out and identified as a person's face. After an additional ten commit operations, the same individual's face now appears in both scene 1 and in scene 7. Since the system has the ability to segment objects (in this case human faces), the system can identify those later on and advise a user that "The individual's face from scene 1 is now also present in scene 7."

Figure 2:
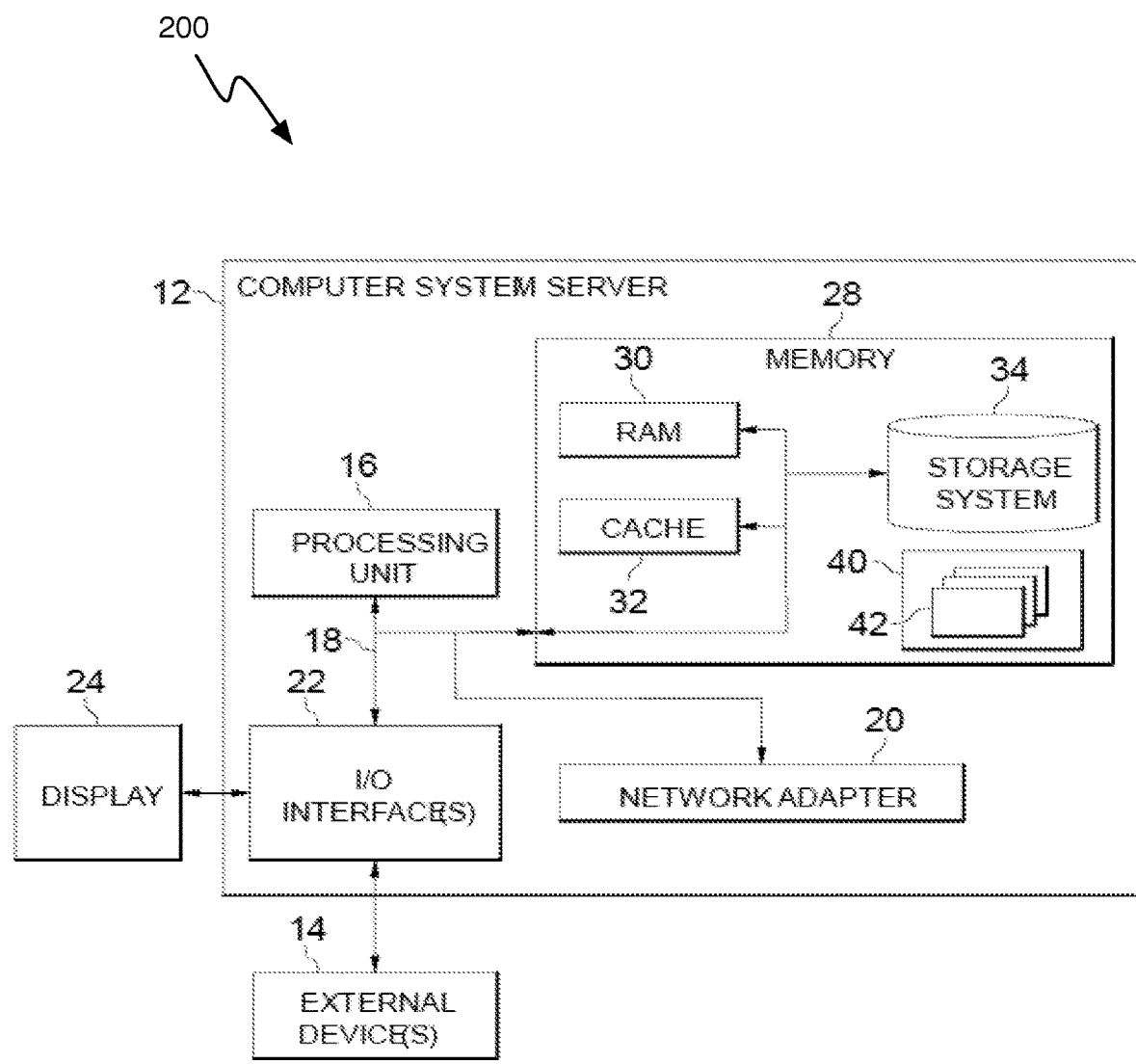
FIG. 2 shows a system for testing the effects that programming code changes have on the rendering of a graphical user interface, in accordance with one embodiment Like reference symbols in the various drawings indicate like elements.

FIG. 2 shows a schematic view of a computer system in which various embodiments of the present invention can be implemented. As shown in FIG. 2, the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system/server 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying program code changes causing a changed visual appearance of a graphical user interface of a computer application, comprising:
receiving at a build system a code change for the computer application, the code change resulting in a changed computer application;
running, by the build system, the changed computer application, including simulating user interactions and capturing and saving screenshots of the visual appearance of the graphical user interface during the run resulting from the code change;
detecting, by the build system and by using computer vision processing techniques, differences between the saved screenshots to identify changes in the visual appearance of the graphical user interface, wherein the computer vision processing techniques include:
determining whether a camera has been rotated between two screenshots,
in response to determining that the camera has been rotated between two screenshots, determining how the two screenshots are rotated with respect to each other by using a SURF (speeded up robust features) algorithm to extract feature points, and by identifying and aligning matching feature points using a RANSAC (Random Sample Consensus) algorithm to thereby align the two screenshots, and
computing a transformation matrix to determine how the two screenshots are rotated with respect to each other;
correlating, by the build system, the identified changes in the visual appearance with a particular section of program code causing the changes in the visual appearance;
providing the identified changes in the visual appearance to a user; and
monitoring actions taken by the user as a result of the identified changes in the visual appearance, wherein the actions taken by the user include accepting or rejecting a code commit request.

2. The method of claim 1, wherein running the changed computer application includes:
capturing and saving screenshots of the visual appearance of the graphical user interface after each user interaction to identify any changes to the visual appearance of the graphical user interface in response to the simulated user interactions.

3. The method of claim 1, wherein detecting differences includes:
comparing differences between saved screenshots of corresponding image frames from two or more different renderings of the computer application to identify changes in the visual appearance in the corresponding image frames resulting from the different renderings.

4. The method of claim 1, further comprising:
using the result of the monitoring to determine which future identified changes are to be deemed relevant and should be provided to the user.

5. The method of claim 4, wherein the determination is performed using a neural network.

6. The method of claim 1, wherein detecting differences includes:
applying a pixel-by-pixel comparison between saved screenshots, or comparing groups of pixels between saved screenshots.

7. The method of claim 6, wherein comparing groups of pixels includes:
determining an entropy value for each of two groups of pixels; and comparing the determined entropy values.

8. The method of claim 1, wherein detecting differences includes:
applying a convolution filter to the saved screenshots before applying the pixel-by-pixel comparison between saved screenshots.

9. The method of claim 1, further comprising:
using feature detection and extraction to identify individual objects that have been changed, added or removed between two screenshots that are compared; and
providing references to the individual objects to a user.

10. A computer program product for identifying program code changes causing a changed visual appearance of a graphical user interface of a computer application, the computer program product comprising a computer readable storage medium having program instructions embodied therewith, wherein the computer readable storage medium is not a transitory signal per se, the program instructions being executable by a processor to cause the processor to perform a method comprising:
receiving at a build system a code change for the computer application, the code change resulting in a changed computer application;
running, by the build system, the changed computer application, including simulating user interactions with the computer application and capturing and saving screenshots of the visual appearance of the graphical user interface during the run;
detecting by the build system and by using computer vision processing techniques, differences between the saved screenshots to identify changes in the visual appearance of the graphical user interface resulting from the code change, wherein the computer vision processing techniques include:
determining whether a camera has been rotated between two screenshots,
in response to determining that the camera has been rotated between two screenshots, determining how the two screenshots are rotated with respect to each other by using a SURF (speeded up robust features) algorithm to extract feature points, and by identifying and aligning matching feature points using a RANSAC (Random Sample Consensus) algorithm to thereby align the two screenshots, and
computing a transformation matrix to determine how the two screenshots are rotated with respect to each other;
correlating, by the build system, the identified changes in the visual appearance with a particular section of program code causing the changes in the visual appearance;
providing the identified changes in the visual appearance to a user; and monitoring actions taken by the user as a result of the identified changes in the visual appearance, wherein the actions taken by the user include accepting or rejecting a code commit request.

11. A build system comprising:
a processor; and
a memory,
wherein the memory contains instructions that when executed by the processor causes the processor to perform a method comprising:
receiving a code change for the computer application, the code change resulting in a changed computer application;
running the changed computer application, including simulating user interactions with the computer application and capturing and saving screenshots of the visual appearance of the graphical user interface during the run;
detecting, using computer vision processing techniques, differences between the saved screenshots to identify changes in the visual appearance of the graphical user interface resulting from the code change, wherein the computer vision processing techniques include:

determining whether a camera has been rotated between two screenshots,
in response to determining that the camera has been rotated between two screenshots, determining how the two screenshots are rotated with respect to each other by using a SURF (speeded up robust features) algorithm to extract feature points, and by identifying and aligning matching feature points using a RANSAC (Random Sample Consensus) algorithm to thereby align the two screenshots, and
computing a transformation matrix to determine how the two screenshots are rotated with respect to each other;
correlating the identified changes in the visual appearance with a particular section of program code causing the changes in the visual appearance;
providing the identified changes in the visual appearance to a user; and
monitoring actions taken by the user as a result of the identified changes in the visual appearance, wherein the actions taken by the user include accepting or rejecting a code commit request.

* * * * *